United States Patent [19]

Acampora et al.

[11] Patent Number: 5,528,583
[45] Date of Patent: Jun. 18, 1996

[54] METHOD AND APPARATUS FOR SUPPORTING MOBILE COMMUNICATIONS IN MOBILE COMMUNICATIONS NETWORKS

[75] Inventors: Anthony S. Acampora, Freehold, N.J.; Mahmoud Naghshineh, Fishkill, N.Y.

[73] Assignee: The Trustees of Columbia University in the City of New York, N.Y.

[21] Appl. No.: 67,717

[22] Filed: May 26, 1993

[51] Int. Cl.$^6$ .............................. H04B 7/26; H04Q 7/22; H04Q 7/24

[52] U.S. Cl. .......................... 370/54; 370/94.3; 370/95.1; 379/60

[58] Field of Search ................................. 370/95.1, 94.3, 370/60, 58.1, 16, 58.2, 58.3, 94.1, 54; 340/825.02, 825.03, 827; 379/58, 59, 60, 63, 220, 221

[56] References Cited

U.S. PATENT DOCUMENTS

| 5,195,090 | 3/1993 | Bollinger et al. | 379/60 |
| 5,260,987 | 11/1993 | Mauger | 379/60 |
| 5,323,446 | 6/1994 | Kojima et al. | 379/60 |

OTHER PUBLICATIONS

Steven E. Minzer, "Broadband ISDN and Asynchronous Transfer Mode (ATM)", IEEE Communication Magazine, pp. 17–24 (Sep. 1989).
P. K. Prasanna et al., "Discussion of Emerging Broadband ISDN Standards", IEEE Transactions on Consumer Electronics, vol. 35, No. 2, pp. 86–91 (1989).
Ian, M. Ross, "Wireless Network Directions", IEEE Communications Magazine, pp. 40–42, (Jun. 1991).

Donald C. Cox, "A Radio System Proposal for Widespread Low-Power Tetherless Communications", IEEE Transaction of Communications, vol. 39, No. 2, pp. 324–335 (1991).
David J. Goodman, "Cellular Packet Communications", IEEE Transaction Communication, vol. 38, No. 8, pp. 1272–1280, (1990).
L. G. Cuthbert, "Issues in the Planning of Broadband ATM Networks", Race R1022 (QMW, UK), pp. 334–337, (1991).
David J. Goodman, "Trends in Cellular and Cordless Communications", IEEE Communications Magazine, pp. 31–40, (Jun. 1991).
Hattori et al., "Personal Communication Concept and Architecture", IEEE Catalogue No. CH2829-0, pp. 1351–1357, (1990).
G. Foster et al. "The ATM Zone Concept", Globecom '88 Conference Record IEEE Catalogue No. 88CH2535-3, pp. 0672–0674, (1988).
Davide Grillo et al., "CCITT E.700 Recommendation Series-A Framework for Traffic Engineering of ISDN" IEEE Journal on Selected Areas in communications, vol. 9, No. 2, pp. 135–141, (1991).

*Primary Examiner*—Wellington Chin

[57] ABSTRACT

Distributed call setup and rerouting are realized in a mobile-communications network. A connection tree is set up within the network, e.g., upon a mobile user accessing a base station. The connection tree comprises communication routes from a fixed point in the network, the root of the tree, to each base station within a vicinity of the base station accessed by the mobile user. When the mobile user moves from one cell to another within the connection tree, the call is rerouted to another route within the connection tree.

18 Claims, 7 Drawing Sheets

| LOOK UP TABLE | | | |
|---|---|---|---|
| VCI IN | PORT IN | VCI OUT | PORT OUT |
| VC2 | 63 | VC0 | 65 |
| VC7 | 63 | VC0 | 67 |
| VC1 | 66 | VC3 | 64 |
| VC3 | 68 | VC3 | 64 |

| LOOK UP TABLE | | | | |
|---|---|---|---|---|
| ENABLED | VCI IN | PORT IN | VCI OUT | PORT OUT |
| 1 | VC1 | 73 | VC2 | 61 |
| 0 | VC1 | 73 | VC7 | 61 |
| 1 | VC3 | 62 | VC4 | 74 |
| 0 | VC3 | 62 | VC4 | 74 |

| LOOK UP TABLE | | | | | |
|---|---|---|---|---|---|
| ENABLED | CONNECTION ID | VCI IN | PORT IN | VCI OUT | PORT OUT |
| 1 | 100 | VC2 | 97 | VC0 | 101 |
| 0 | 100 | VC2 | 97 | VC0 | 103 |
| 1 | 100 | VC1 | 102 | VC3 | 98 |
| 0 | 100 | VC1 | 104 | VC3 | 98 |

FIG. 6A

| LOOK UP TABLE | | | | | |
|---|---|---|---|---|---|
| ENABLED | CONNECTION ID | VCI IN | PORT IN | VCI OUT | PORT OUT |
| 1 | 100 | VC1 | 115 | VC2 | 95 |
| 0 | 100 | VC1 | 115 | VC2 | 122 |
| 1 | 100 | VC3 | 96 | VC4 | 116 |
| 0 | 100 | VC3 | 123 | VC4 | 116 |

| LOOK UP TABLE | | | |
|---|---|---|---|
| VCI IN | PORT IN | VCI OUT | PORT OUT |
| VC2 | 139 | VC0 | 135 |
| VC7 | 139 | VC0 | 137 |
| VC1 | 136 | VC3 | 140 |
| VC1 | 138 | VC3 | 140 |

| LOOK UP TABLE | | | | | |
|---|---|---|---|---|---|
| ENABLED | CONN-ECTION ID | VCI IN | PORT IN | VCI OUT | PORT OUT |
| 1 | 100 | VC1 | 147 | VC2 | 141 |
| 0 | 100 | VC1 | 147 | VC7 | 141 |
| 1 | 100 | VC3 | 142 | VC4 | 148 |

METHOD AND APPARATUS FOR SUPPORTING MOBILE COMMUNICATIONS IN MOBILE COMMUNICATIONS NETWORKS

BACKGROUND OF THE INVENTION

This invention relates generally to mobile communications systems and, more specifically, to distributed call setup, admission, control and rerouting in mobile communications systems capable of supporting asynchronous transfer mode.

In recent years, interest has rapidly grown in two distinct areas of the communications field. First, the popularity of mobile, or personal, communications has increased immensely and is expected to grow in the near future to the point where existing systems will be unable to support the demand for mobile communications. The basic problem facing the future of mobile communications systems is the lack of available bandwidth for the mobile user's wireless transmission to a fixed network.

Current mobile communications systems employ the concept of "cells." A cell is a geographical area which is assigned to a corresponding base station which is in turn wired into a fixed communications network. The capacity of a cellular system can become quite high since the available bandwidths can be reused among the various cells. The fixed network is typically a "mesh network." A mesh network is comprised of numerous switches connected together by communication links. The mesh network is set up so that a communications route may be traced from any one switch to any other in the network through at least one, and more often, many combinations of links and switches. Some of the switches in the network, in addition to being connected to other switches, will also be connected via communication links to one or more of the base stations and/or fixed termination points such as a home telephone.

When a mobile user wishes to place a call, the call is transmitted through a communication medium, often a radio channel, to the base station assigned to the user's cell. From the base station, the call is carried by the mesh network to the user's intended destination. When the mobile user moves from one cell to another, a call handoff, or handover, between base stations takes place. The handoffs are performed by a central system controller. This is known as centralized call processing.

Due to the limited bandwidth available for the wireless transmissions of mobile users' calls, each cell can handle only a limited number of callers. Thus, to meet the needs of an increasing population of mobile users, the area assigned to each cell must be decreased. Therefore, the number of such cells, and their corresponding base stations, increases for a given geographical area. The smaller cell size means that the rate of call handoffs per second in a mobile communications system increases, thereby placing a great burden on the central system controller. It is predicted that in the near future, the centralized system controllers of today's systems will be unable to handle the call handoff rate which will be necessary to meet the demand for mobile communications. The need for a distributed call processing system, rather than a centralized system, has been identified, but no comprehensive solutions have as yet been found.

The second area of communications which has been the focus of much research is the standardization of broadband integrated services digital networks (B-ISDN) utilizing the asynchronous transfer mode (ATM). Present communications systems rely on circuit switching techniques. In these circuit switching systems, a circuit path between the caller and his destination is found and used exclusively for a single call until the call terminates. On the other hand, future B-ISDN systems will employ packet, or cell, transport techniques. This means, essentially, that a communication is broken up into discrete "packets", or "cells" (unrelated to the geographic cells of mobile communications systems), which are sent one at a time through the system and received at the intended destination as an uninterrupted communication. Packets from many different callers may simultaneously share the same communication link, thus making these B-ISDN systems a more efficient means of communication than the circuit switching systems.

ATM is the target mode for future B-ISDN systems. The other, and at one time favored, choice for B-ISDN packet communications was synchronous transfer mode (STM) which would handle the packets from a given communication during allocated time slots occurring on a regular basis. For reasons unimportant to this invention, ATM was chosen over STM.

The ATM packets are themselves divided into two sets of information. One set is the information which the user intends to transmit and the other set is called the "header." The header contains routing information, including a virtual channel identifier (VCI). The VCI, simply put, is a code assigned to the packet which lets an ATM switch know where to send the packet next, based on the switch port where the packet has been received.

A conventional ATM B-ISDN switch, hereinafter called an ATM switch, has several input and output ports. Embodied in the implementation of a conventional ATM switch is a "lookup table." The lookup table may be thought of as having four columns: input port, incoming VCI, output port, and outgoing VCI. For every possible input port and incoming VCI combination, there is a corresponding output port and outgoing VCI combination programmed into the lookup table. When an ATM switch receives a packet at a given port, the ATM switch will find the row in the lookup table which has the incoming VCI and input port which correspond to that of the received packet. The ATM switch will then switch or route the packet to the output port which appears in the same row and replace the incoming VCI in the packet header with the outgoing VCI. This process is performed at each switch until the packet arrives at its destination.

The heightened interests in both mobile communications and B-ISDN communication using ATM which has been described above has led to the present invention. Up until now, no system, existing or proposed, has provided a technique for distributed, as opposed to centralized, call setup and rerouting in a mobile ATM based B-ISDN system with several ATM switches.

SUMMARY OF THE INVENTION

In mobile communications, distributed call setup and rerouting are realized. A communication route is determined which includes a connection from a base station via a switching node. A connection tree is determined, to include potential connections from other base stations to the switching node. When the mobile user moves from one cell to another, corresponding to a change in base station within the connection tree, the call is automatically handed over or rerouted to another route within the connection tree. By obviating the need for a central processor for handovers within the connection tree, a greater number of communications may be supported than in conventional mobile communications systems.

BRIEF DESCRIPTION OF THE DRAWINGS

Other objects, features and advantages of the invention will become apparent, and its construction and operation better understood, from the following detailed description when read in conjunction with the accompanying drawings, in which.

DETAILED DESCRIPTION OF PREFERRED EMBODIMENTS

Figure 1:
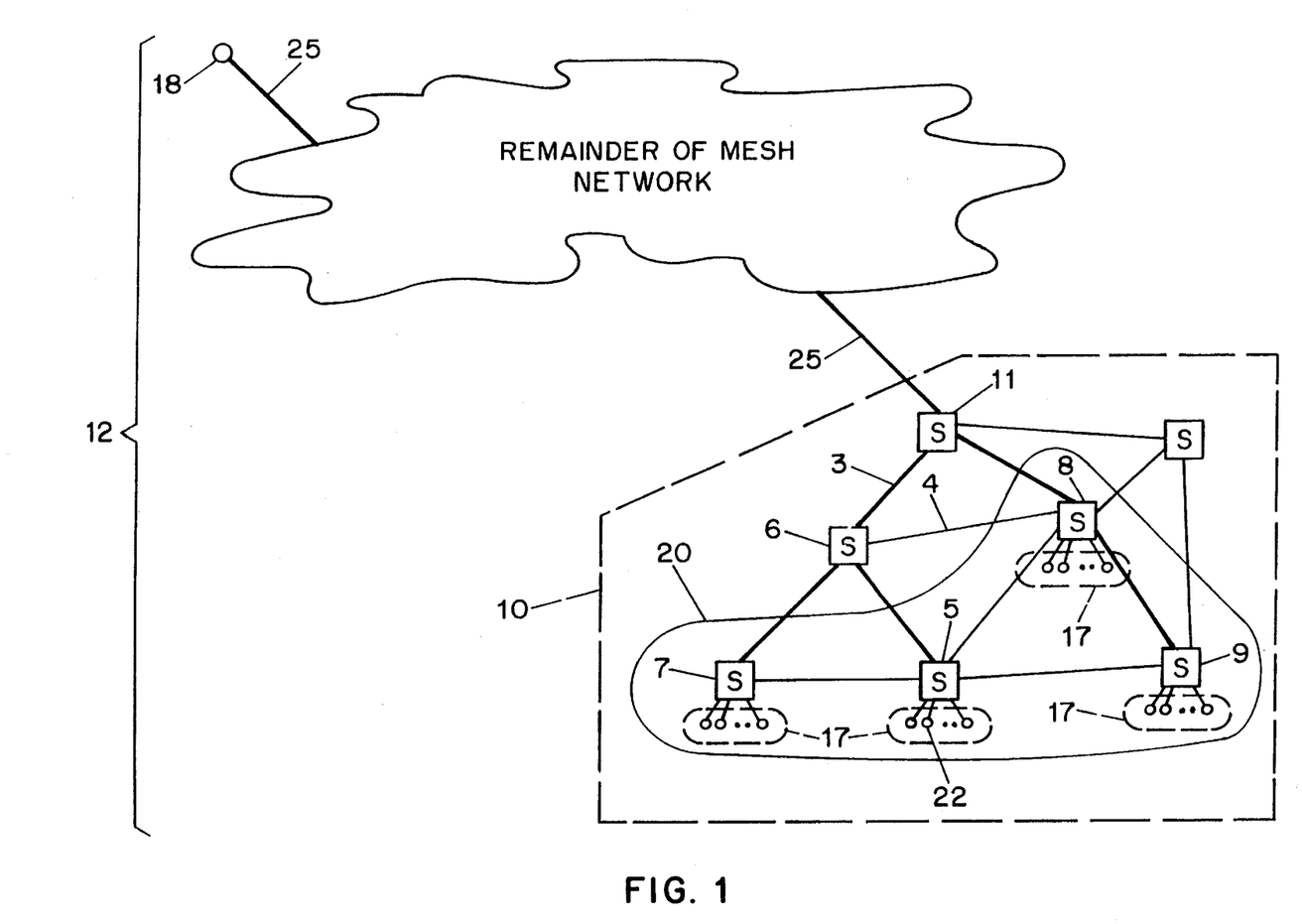
FIG. 1 is a representation of a connection tree in a mesh network according to an exemplary embodiment of the present invention.

One embodiment of the general architecture of the present invention may be seen in FIG. 1. At call setup time, a connection tree 10 within a communications network 12 having a packet switching architecture is defined for a mobile user. The communications network 12 is a mesh network as described in the Background section hereinabove.

The connection tree 10 established within the mesh network 12 extends a connection from a fixed point 11 of the network, called the root, to each one of the base stations 17 in the neighborhood 20 of the mobile user. The base station in charge of a mobile user is called the mobile user's access point, base station 22 in this example. The neighborhood 20 may be defined as the area within a predetermined distance of the mobile user's access point 22. A connection tree 10 provides a route, referred to as a virtual channel connection, to the mobile user's access point 22 as well as a virtual channel connection for each of its neighboring mobile access points 17 such that a concatenation of one of these virtual channel connections with another virtual channel connection 25 provides an end-to-end connection in which the mobile user can be the source or destination of the traffic. At the time a connection tree 10 for a mobile user is set up, a unique connection tree ID is assigned to the user. The significance of the connection tree ID will be explained later.

As discussed above, the connection tree 10 is set up with reference to the mobile user's location. This is the case whether the mobile user is the source or destination of a call. In both instances, the connection tree 10 will be set up at the mobile user's first interaction with a base station 17.

Further explanation of the connection tree architecture will be made with reference to FIG. 1. FIG. 1 represents just one of a large number of possible connection tree configurations. Connection tree links are shown with thick lines, such as link 3, and other links of the network are shown with narrow ones, such as link 4. For the remainder of this disclosure, the existence of links not included in the connection tree will be ignored. This, of course, does not mean that they should not be thought of as part of the network. Also, although they appear in the figures, the links which are included in the connection tree will not be discussed and should be assumed to connect the switches and base stations as shown in the figures.

Returning to FIG. 1, at the call setup time, the mobile user is communicating to a base station 22 connected to switching node 5. Switching nodes 7, 8, and 9 are the switches to which all the neighboring base stations 17 are connected. In any end-to-end connection for which the mobile user is the source or the destination, the communication path is divided into two parts. One part of the path is contained within the connection tree 10. This part of the path changes as the result of the mobile user's connection hand-offs. Details of this procedure are described hereinbelow. The other part of the path, which is from the root 11 of the connection tree to the other end of the connection 18, remains fixed throughout most of the connection lifetime. It should be noted, however, that the fixed part of the path will not always be necessary. A mobile user may wish to communicate with a destination, fixed or mobile, within the same connection tree. In this scenario, the communications will be routed to the root of the connection tree, but instead of then being switched out of the tree and through a fixed route, the communications will instead be routed back into the tree to the intended recipient. Thus, the two-part path consists of two connection trees rather than a connection tree and a fixed route.

Whenever the user reaches the boundary of the connection tree 10, a new connection tree is established so that the neighboring base stations of the mobile user's access point belong to a new connection tree. This procedure is called the connection tree hand-off. Any time there is a hand-off from one base station 17 to another, the current virtual channel connection is disabled and the virtual channel connection terminating at the new mobile access point is enabled. The part of the path in the wired network originating at the mobile user's call destination point 18 and which terminates at the root 11 of the connection tree, denoted by 25, is fixed and reused.

Figure 2:
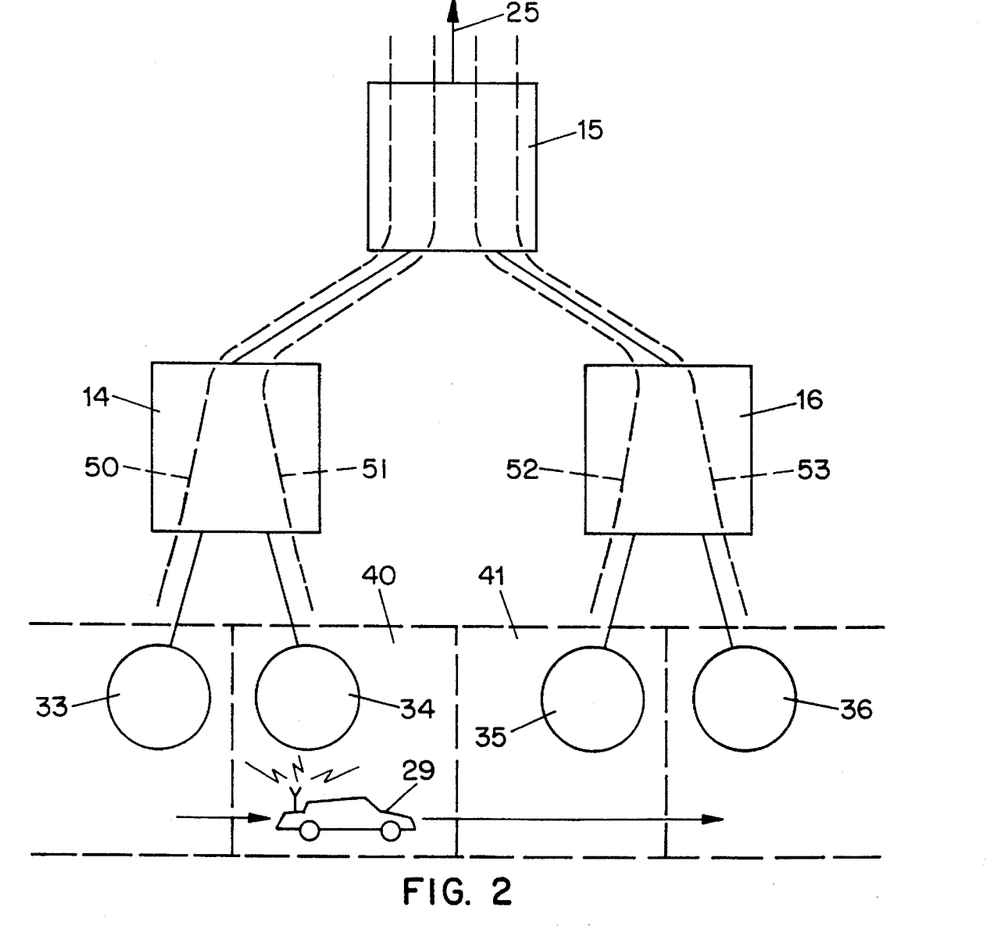
FIG. 2 is a representation of a simple connection tree according to a preferred first embodiment of the present invention.

An example may be illustrated referring to FIG. 2. FIG. 2 depicts a simple connection tree having three switching nodes 14, 15, 16 and four base stations 33, 34, 35, 36. The mobile user is represented by an automobile 29. Upon placing a call in the vicinity of base station 34, the connection tree is set up. Switch 15 is the root of the connection tree and four virtual channel connections 50, 51, 52, 53 to the four base stations 33, 34, 35, 36 are provided to the mobile user 29. At the outset, the mobile user's access point is base station 34 and virtual channel connection 51 is enabled. As the mobile user 29 moves out of the geographical cell 40 assigned to base station 34 and into the cell 41 assigned to base station 35, a call hand-off takes place whereby virtual channel connection 51 is disabled, virtual channel connection 52 is enabled and base station 35 becomes the mobile user's access point.

In this embodiment of the invention, call hand-off is initiated by the mobile user. This is called mobile initiated hand-off. A hand-off may be initiated by any one of several well known means. For example, the user may monitor power from each of the base stations in its connection tree and initiate a hand-off whenever the signal strength received from the user's current base station approaches some threshold of unacceptability and there is at least one base station in the tree from which an acceptably high power level is detected. In such a case, the mobile user would initiate a hand-off to any base station from which acceptably high power is detected. The rerouting of the connection is done within the connection tree and the involvement of a central network call processor for rerouting is unnecessary. Since a distributed rerouting of connections is provided, a large number of hand-offs can be realized in a "micro-cell/pico-cell" environment which has a high frequency of hand-offs.

Figure 8:
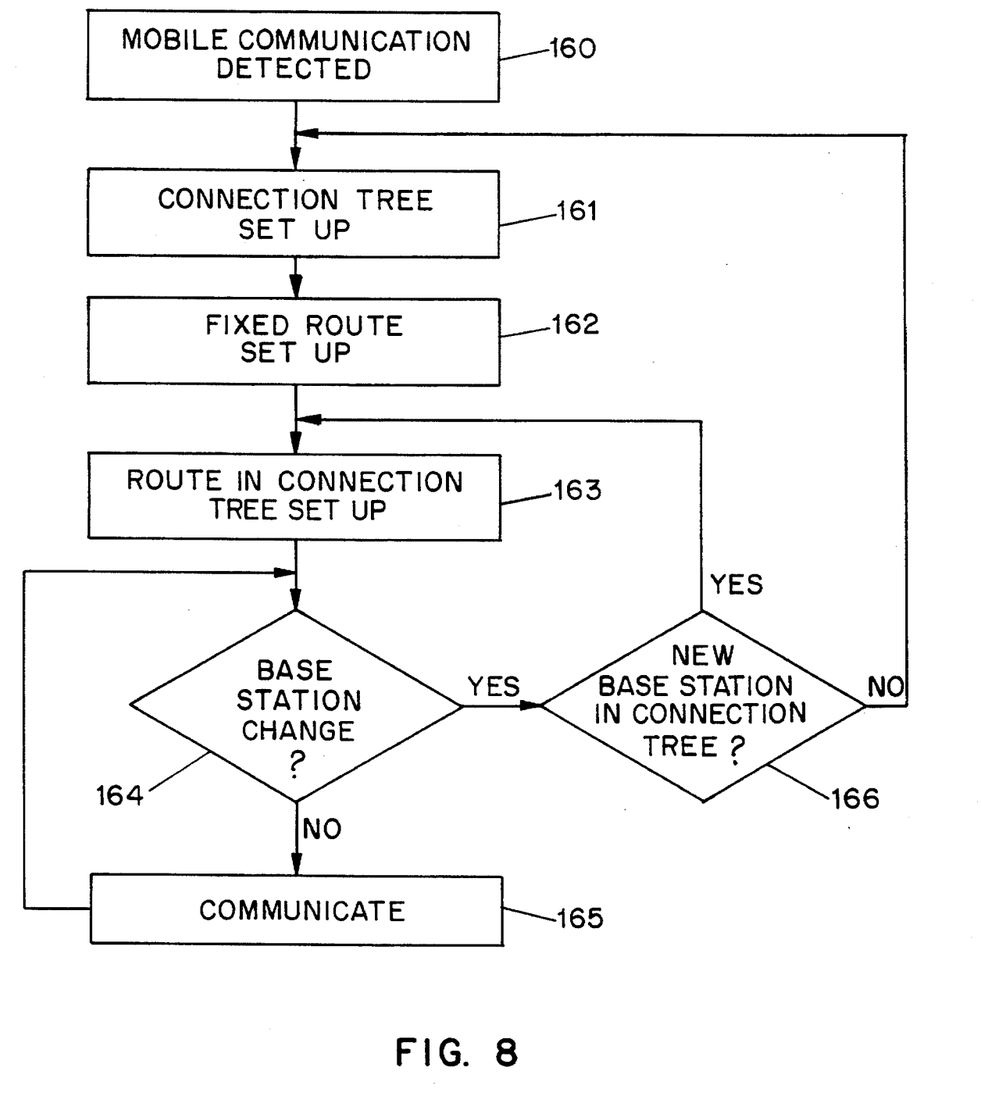
FIG. 8 is a flow diagram of a communications method in accordance with a preferred embodiment of the present invention.

FIG. 8 shows in simple flow chart form the steps performed in the connection tree switching scheme as described above. A communications request is detected by a base station in block 160. This is followed by connection tree setup and setup of the fixed portion of the end-to-end connection in blocks 161 and 162 respectively. The specific route within the connection tree between the root and the base station where the communication was detected is defined in block 163. In block 164, the system looks for a change in the user's base station. If the user is still within the vicinity of the base station, the communication continues in block 165. If the user has moved into the vicinity of a new base station, the system looks to see if the new base station is within the connection tree in block 166. If so, control returns to block 163 and a new route within the connection tree is defined. If the new base station is not within the connection tree, control returns to block 161 and a new tree is set up. This will continue until the communication is terminated, which can occur at any time.

Two schemes for rerouting of the connections in the connection tree will be discussed herein. The schemes are devised for a packet switched B-ISDN asynchronous transfer mode (ATM) system as described in the Background section of this specification. This should not be interpreted to limit the use of the connection tree system discussed above to a packet switched B-ISDN ATM system. It is possible to use the connection tree architecture described above in other types of packet switched communications systems.

The term "switch" used in the description of these schemes should be interpreted to include any switching node or network, such as a local area network (LAN) or metropolitan area network (MAN), which is capable of ATM packet transport based on virtual channel identifiers. The terms "communication" or "call" as used in the description should be interpreted to include phone, fax, and any other type of communication which can be supported by a B-ISDN ATM system.

A. Scheme 1

Figure 3:
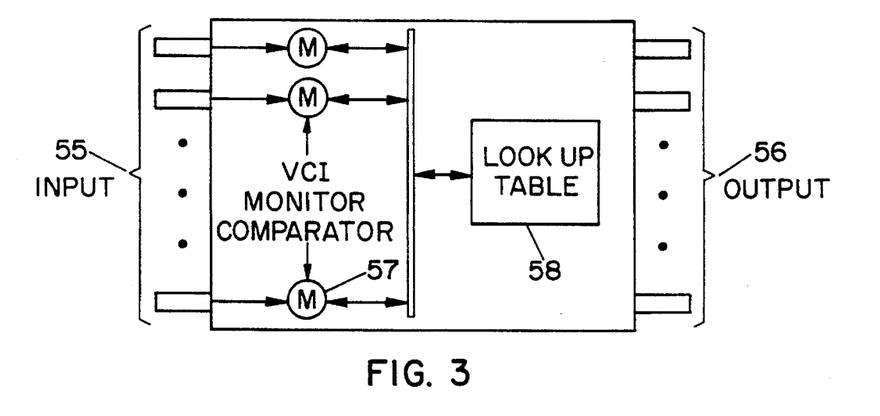
FIG. 3 is a representation of an ATM Switch/VCI Translator.

As described above, at call setup time, a connection tree is defined for the user. In this embodiment of a connection tree, the root of the tree is a switch with an added feature which is described herein. This switch is shown in FIG. 3 and is called an ATM Switch/VCI Translator.

An ATM Switch/VCI Translator performs the virtual channel connection rerouting in the mobile user's connection tree. It is an ATM switch having input ports 55 and output ports 56 with additional components which will be discussed with reference to FIG. 3. At each input port 55 of the switch, there is a VCI monitor/comparator 57 which has read/write access to the switch's routing lookup table 58. The concept of a routing lookup table was discussed in the Background section of this specification.

The VCI monitor/comparator 57 copies all incoming packet headers, each of which includes a virtual channel identifier, to its local memory and compares them to the lookup table 58. It associates a virtual channel connection from the root of the tree to the base station of a mobile connection with an incoming and outgoing VCI as well as the incoming and outgoing switch ports of the connection. To clarify this procedure an example is given in FIG. 4.

Figure 4:
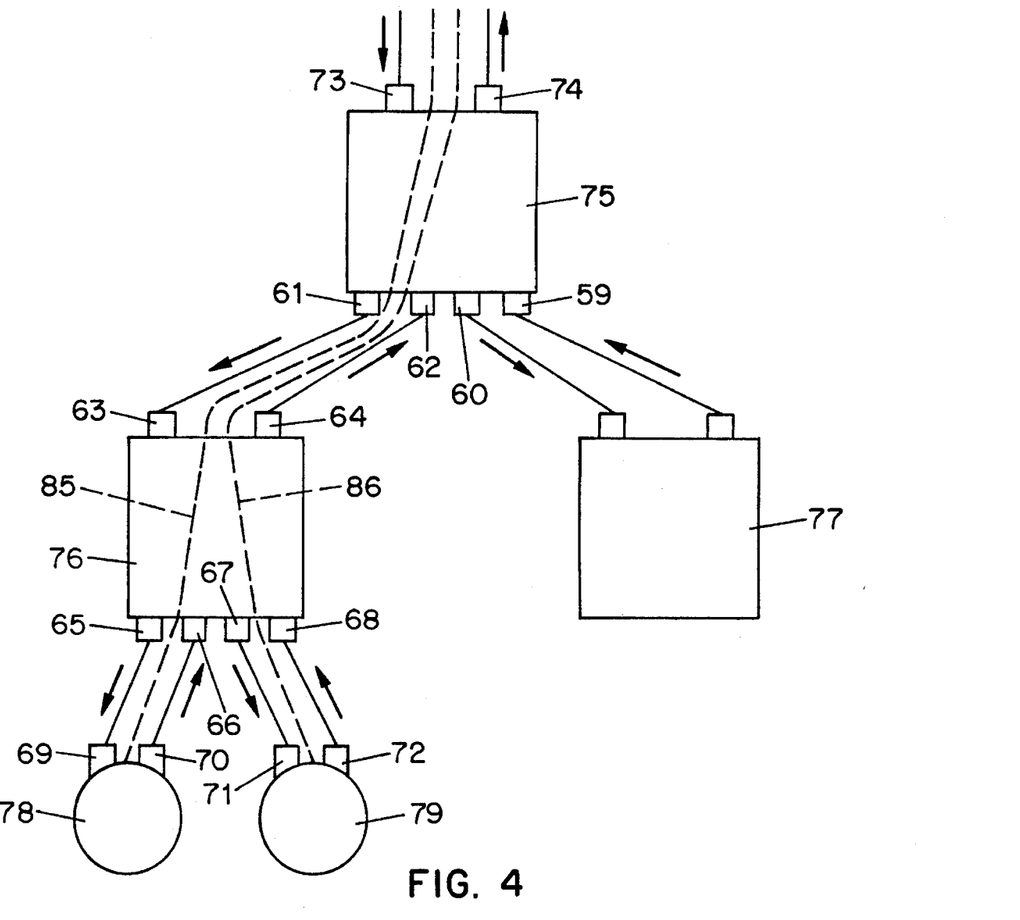
FIG. 4 is a representation of a simple connection tree according to a preferred second embodiment of the present invention in which one of the ATM switches is an ATM Switch/VCI Translator.
Figure 4A:
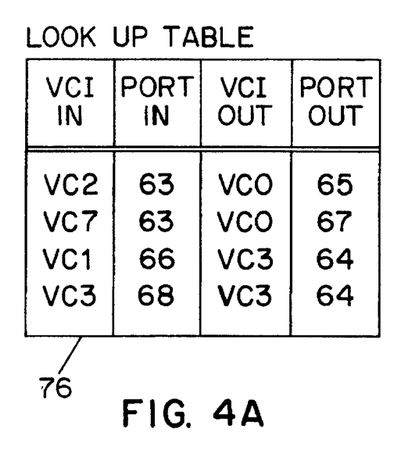
FIGS. 4A and 4B are representations of the lookup tables which correspond to two of the switches.
Figure 4B:
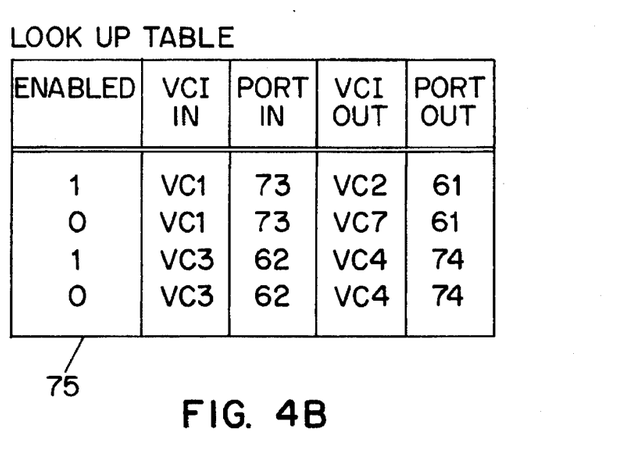

FIG. 4 shows a simple connection tree. The root of the connection tree is an ATM Switch/VCI Translator 75 having three input ports 59, 62, 73 and three output ports 60, 61, 74. The other switches 76, 77 are ordinary ATM switches. Switch 76, through which our call will travel, has three input ports, 63, 66, 68 and three output ports 64, 65, 67. Portions of the lookup tables of switches 75 and 76 are also shown in FIGS. 4A and 4B. The lookup table of an ATM Switch/VCI Translator differs from that of a conventional ATM switch in that only certain rows will be enabled depending on which of the base stations within the tree is serving as the mobile user's access point.

In FIG. 4, when the mobile user is communicating to the base station 78, there is a virtual channel connection 85 established between the root 75 of the connection tree and the base station 78. Communications leaving base station 78 travelling along path 85 leave base station 78 with virtual channel identifier VC1. The packets are transmitted via output port 70 into input port 66 of switch 76. Switch 76 reads VC1, consults the third row of its lookup table and assigns virtual channel identifier VC3 to the packet to let ATM Switch/VCI Translator 75 know where the communication is coming from and what the packet's final destination is. The packet is transmitted via output port 64 of switch 76 and enters input port 62 of ATM Switch/VCI Translator 75. When the VCI Monitor/Comparator at input port 62 reads VC3, the ATM Switch/VCI Translator enables rows one and three which correspond to path 85. The packet is then assigned virtual channel identifier VC4, as per row three of the lookup table, to tell the fixed portion of the end-to-end connection where the packet is going. The packet then leaves the connection tree via output port 74.

Packet communications returning to base station 78 from outside the connection tree will enter the connection tree at ATM Switch/VCI Translator 75 input port 73 with a virtual channel identifier of VC1. The VCI Monitor/Comparator at input port 73 reads VC1, finds row one enabled and assigns a virtual channel identifier of VC2 to indicate to switch 76 that the packet is destined for base station 78. The packet leaves via output port 61 and goes into input port 63 of switch 76. Switch 76 reads VC2 and finds it in the first row of its lookup table. The packet is then given virtual channel identifier VCo, is switched to output port 65 and is transmitted into base station 78 input port 69.

When the mobile user hands off to base station 79, it sends ATM packets with the virtual channel identifier VC5 from output port 72. Since the lookup table for switch 76 assigns virtual channel identifier VC8 to packets which enter the switch at input port 68 with virtual channel identifier VC5, the packets generated by the mobile user will be received at input port 62 of ATM Switch/VCI Translator 75 with the virtual channel identifier VC8. Since this is not the virtual channel identifier VC3 which was assigned by switch 76 to packets received from base station 78, the VCI monitor/comparator at ATM Switch/VCI Translator 75 realizes that a hand-off has taken place and that the mobile user is communicating to base station 79. Therefore, ATM Switch/VCI Translator 75 updates the lookup table of the switch such that packets going from ATM Switch/VCI Translator 75 output port 61 to base station 79 input port 71 along path 86 are switched accordingly as are packets going from base station 79 output port 72 to ATM Switch/VCI Translator 75 input port 62. In other words, the VCI monitor/comparator enables the second and forth rows of the lookup table and disables the first and third rows.

To sum up the major features of the scheme described above: First, the mobile user initiates the rerouting as the result of its hand-off by changing the VCI of its packets. It receives all the VCIs associated with each base station in its connection tree at the call setup time. By sending packets with VCIs associated to a specific base station, it initiates the rerouting of its connections to that base station. Second, the ATM Switch/VCI Translator updates the lookup table of the switch at the root of the connection tree so that the reverse connections are established accordingly. There, rerouting operations are all performed without the use of a centralized call processor in a distributed manner, thus enabling the system to handle frequent call hand-offs.

B. Scheme 2

Figure 5:
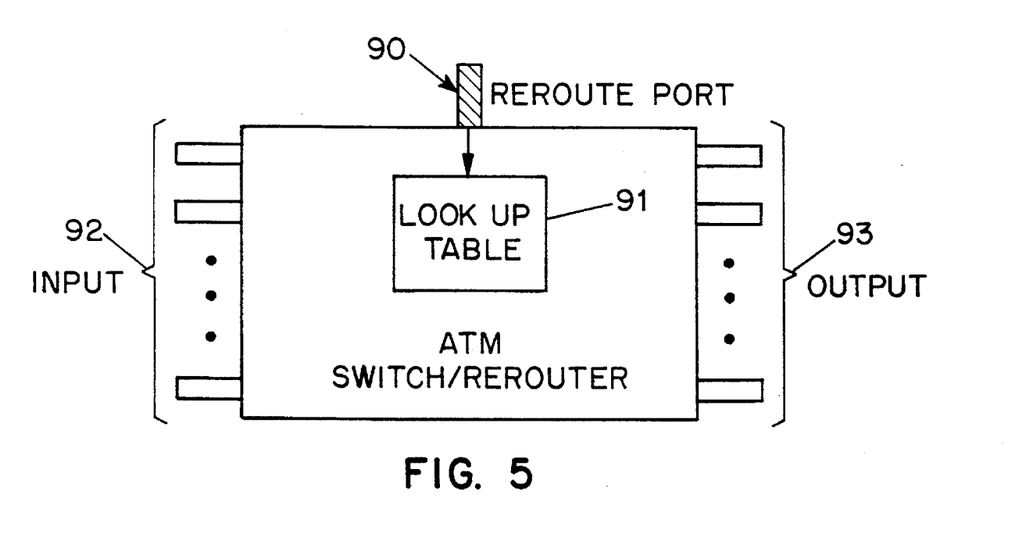
FIG. 5 is a representation of an ATM switch/rerouter.

In a second embodiment of the connection tree, the call set up and routing is distributed by adding one or more special ATM switches which are called Switch/Rerouters, shown in FIG. 5. An ATM Switch/Rerouter is any switch capable of ATM Virtual Channel switching as specified by CCITT standards with an additional feature. In addition to conventional input ports 92 and output ports 93, it has a specific port, called the Reroute Port 90, which has read/write access to the switch's routing lookup table 91.

In any mobile network with ATM packet transport, one or more ATM Switch/Rerouters may be deployed in order to support distributed, fast connection set up and rerouting, the details of which will be described below. Again, at the connection setup time, a connection tree is established which connects all base stations in the neighborhood of the mobile user.

Rerouting of connections as a result of hand-offs is done by sending special packets called control packets to all Switch/Rerouters of the connection tree. It is important to note that in this scheme, the mobile user's access point will almost always see the same VCI for a mobile user's connection. As a result, a hand-off will be totally hidden from the mobile user and its wireless MAC protocol.

A connection cannot, however, keep its VCI at the user-network interface at all times for all mobile access points. Since VCI's are reusable, a specific user might move into an access point area in which another connection has been assigned to the same VCI at the user-network interface. This scenario is called "terminating VCI collision." This problem can be overcome in the following way. Each connection can be ensured a unique VCI at the mobile access point in a given geographical area. Each area could cover many geographic packets. When a user moves out of the domain of its unique VCI, his or her connection is assigned a new VCI at the mobile access point interface and its adaptation layer is notified to take actions accordingly. Also, these unique user-network interface virtual channel identifier domains should overlap so that there would be no oscillating phenomenon at their boundary. As long as the mobile user's connection is handed off to the neighboring base stations of its connection tree, rerouting is done entirely by one or more ATM Switch/Rerouter nodes.

Scheme 2 may be carried out with either several or only one Switch/Rerouter. The method employing several Switch/Rerouters within the connection tree will be discussed first followed by a discussion of the method requiring only one Switch/Rerouter at the root of the connection tree.

Method 1: Distributed Call Setup and Reroute with Several Switch/Rerouters

Figure 6:
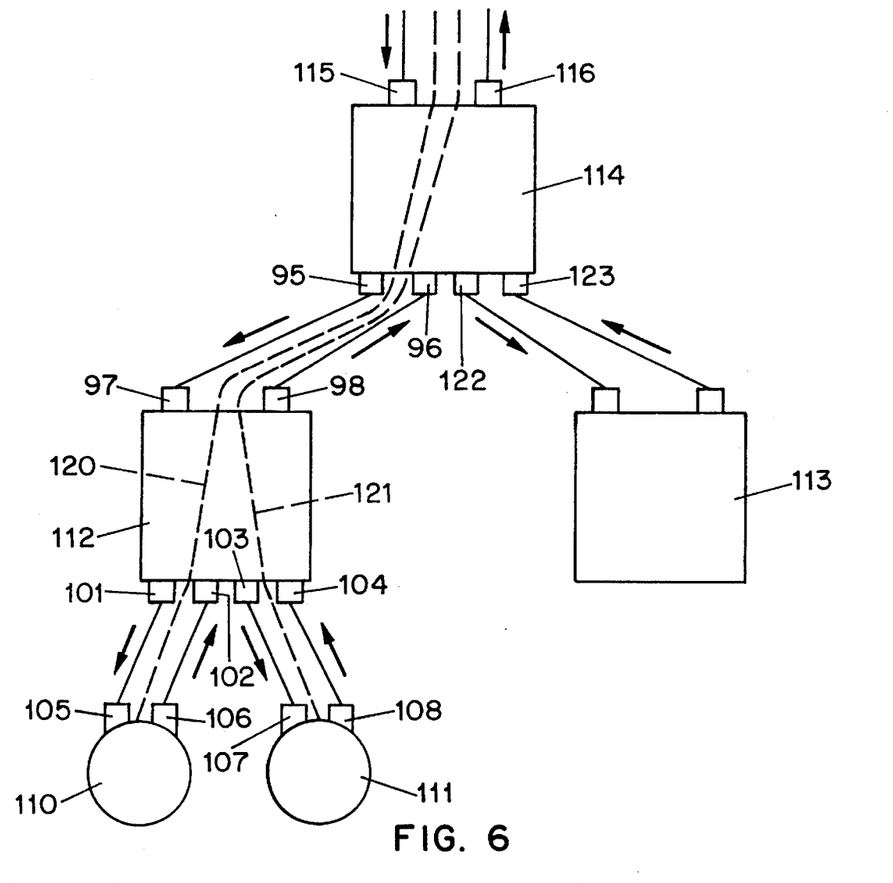
FIG. 6 is a representation of a simple connection tree according to a preferred third embodiment of the present invention in which there are three ATM Switch/Rerouters.
Figure 6A:
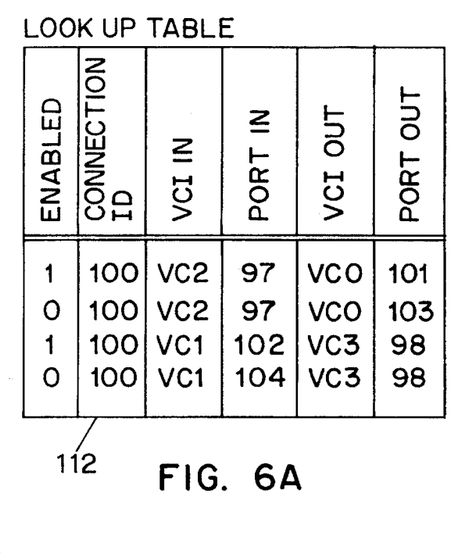
FIGS. 6A and 6B are representations of the lookup tables which correspond to two of the switches.
Figure 6B:
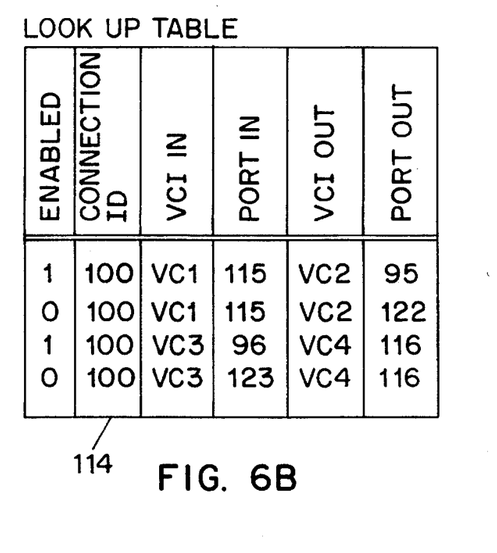

In FIG. 6, a simple connection tree, which has as its root ATM switch 114, is shown. This connection tree includes all the neighboring base stations, each having an address, which are connected to switches 112 and 113. For simplicity, only base stations 110 and 111 are shown. All three switching nodes 112, 113, 114 in this example are ATM Switch/Rerouters. For specific illustration, it will be assumed that a mobile user is communicating to the base station 110. The mobile user is assigned a unique Connection ID, 100, which remains the same everywhere within the connection tree. For this case, the lookup tables at ATM Switch/Rerouters 112 and 114 are shown in FIGS. 6A and 6B. Each of these ATM Switch/Rerouter lookup tables has the capacity to have its rows either enabled or disabled just as in the ATM Switch/VCI Translators. In the ATM Switch/Rerouters, the updating process is accomplished via control messages received at the reroute port, while in the ATM Switch/VCI translators, the updating was done using a VCI Monitor/Comparator at each input port.

In this scheme, each base station has a unique ID, distinct from the user's connection ID. Both IDs are included in the payload of the control packet, or control message. In each tree there are predefined routes for control messages called control virtual channel connections which start from each base station and terminate at the Reroute port of each ATM Switch/Rerouter. The control messages are generated either by the mobile user or by the base station accessed by the mobile user at the time a handoff occurs. These messages are switched like any other ATM packet and arrive at the reroute ports. Upon arrival of a control message at a reroute port, the ATM Switch/Rerouter identifies which row of its lookup table should be enabled based on the Connection ID and the base station ID contained in the payload. Where, as in our example, multiple ATM Switch/Rerouters are employed, the switch may take no action at all.

Returning to the example, when the mobile user first communicates to the connection tree, control signals are sent out to each of the ATM Switch/Rerouters 112, 113, 114. The control signals enable the first and third rows of the lookup tables for ATM Switch/Rerouters 112 and 114. This sets up connection path 120 through the connection tree. Thus, any packet with virtual channel identifier VC1 coming into the connection tree on input port 115 of the ATM Switch/Rerouter 114 is switched to output port 95 and given virtual channel identifier VC2. The packet then enters ATM Switch/Rerouter 112 at input port 97. Since row one of the lookup table for the ATM Switch/Rerouter 112 has been enabled by the control signals, the packet is assigned the virtual channel identifier VCo, which is unique to the mobile user's connection, and sent via output port 101 to the input port 105 of base station 110.

In the reverse direction, an ATM packet entering ATM Switch/Rerouter 112 at input port 102 from output port 106 of base station 110 with the virtual channel identifier VC1 is transported through ATM Switch/Rerouter 112, via output port 98 with the virtual channel identifier VC3, into ATM Switch/Rerouter 114 input port 96 and out of output port 116 of the ATM Switch/Rerouter 114 with the virtual channel identifier VC4.

Further, for specific illustration, it will now be assumed that the mobile user establishes a connection with base station 111. In this case, control messages are sent to the Reroute Ports of ATM Switch/Rerouters 112, 113, and 114 by the base station 111 indicating the base station ID and the mobile user's connection tree ID, in this example 100.

Only the lookup table of ATM Switch/Rerouter 112 is changed by the control messages received from base station 111 at the Reroute Port. The control message essentially tells the switch to enable connection 121 and disable connection 120. To do this, the lookup table's first and third rows are disabled and its second and forth rows are enabled. Since Switch/Rerouter 112 has the capability to have its lookup table updated, there is no need to update the lookup table of ATM Switch/Rerouter 114 because all packets intended for the mobile user are routed from ATM/Switch Rerouter 114 to ATM Switch/Rerouter 112 whether the user is accessing base station 110 or base station 111 and therefore only one set of connection data need be changed.

Now, the packets entering input port 115 of ATM Switch/Rerouter 114 with virtual channel identifier VC1 are transported through ATM Switch/Rerouter 112, via output port 103 to input port 107 of base station 111 with virtual channel identifier VCo along path 121. The reverse connection along path 121 from output port 108 of base station 111 to ATM Switch/Rerouter 112 input port 104 and on to output port 116 of ATM Switch/Rerouter 114 is maintained as well. It is important to note that this distributed reroute mechanism provides the same virtual channel identifiers at mobile access point 110 or 111, as well as at ATM Switch/Rerouter 114. As a result, the hand-off and rerouting are transparent to the mobile user as well as to the rest of the virtual channel/path from ATM Switch/Rerouter 114 throughout the network to the other end of the connection.

Method 2: Distributed Call Setup and Reroute with One Switch/Rerouter

Figure 7:
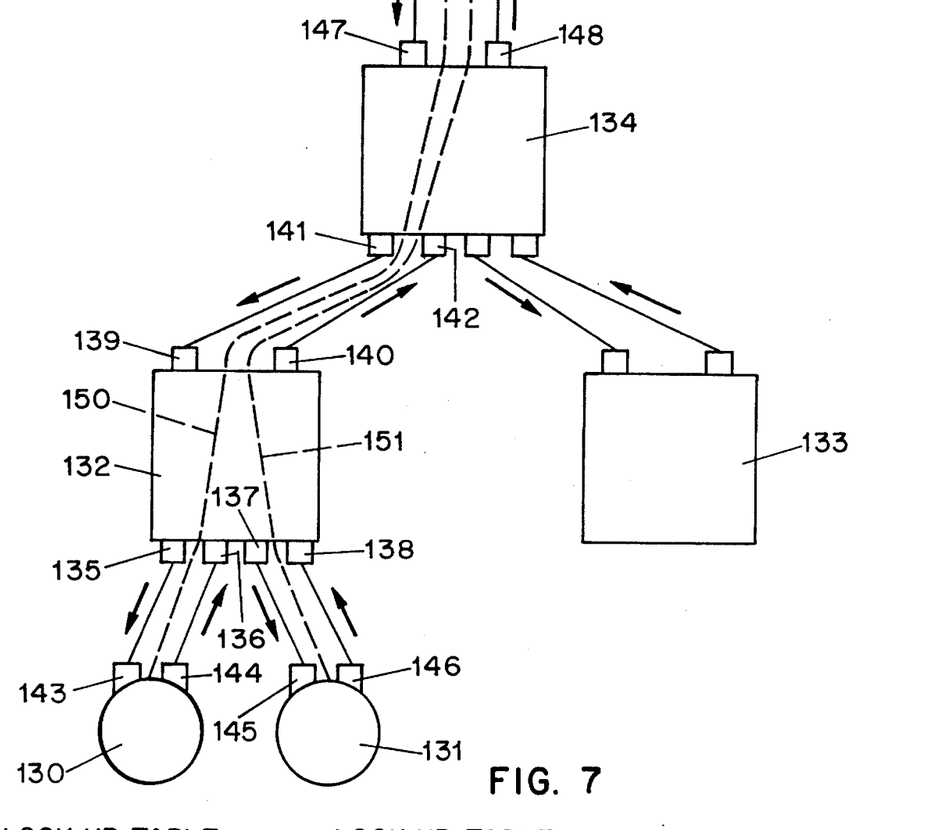
FIG. 7 is a representation of a simple a connection tree according to a preferred fourth embodiment of the present invention in which one of the switches is a Switch/Rerouter.
Figure 7A:
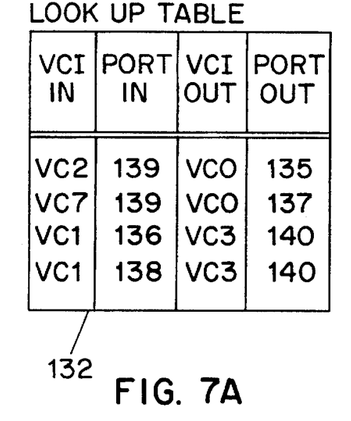
FIGS. 7A and 7B are representations of the lookup tables corresponding to two of the switches.
Figure 7B:
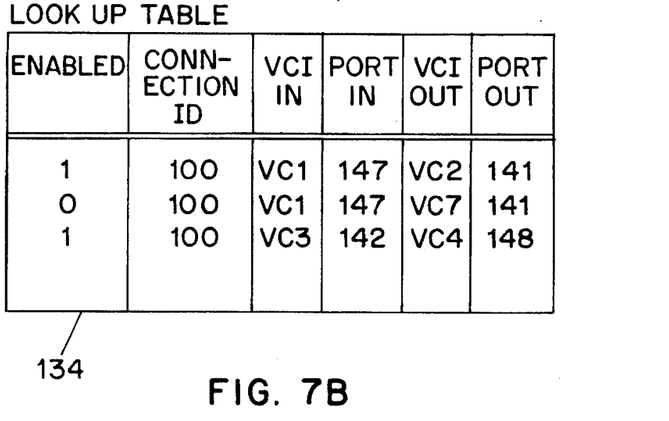

In this section, it is demonstrated how the distributed call setup and reroute can be implemented with only one ATM Switch/Rerouter which is placed at the root of the connection tree. For the purpose of illustration, an example for this case is given using the simple connection tree in FIG. 7. It will be assumed that the mobile user is connected to the network via a channel to the base station 130. In this case a virtual channel connection 150 is established between ATM Switch/Rerouter 134 and base station 130. At the time the mobile user establishes the connection, control message packets are sent to ATM Switch/Rerouter 134 which are read by the reroute port and which enable the first and third rows of the lookup table for ATM Switch/Rerouter 134. Packets then leave base station 130 output port 144 with virtual channel identifier VC1. The packets enter switch 132, like switch 133, an ordinary ATM switch, at input port 136. The switch's lookup table directs the packet via port 140 with virtual channel identifier VC3. The packets enter ATM Switch/Rerouter 134 at input port 142. Since row three of the lookup table is enabled, the packets are given virtual channel identifier VC4 and are sent via port 148 to the fixed route portion of the end-to-end connection.

Packets coming into port 147 of ATM Switch/Rerouter 134 from the fixed route which are destined for base station 130 will have a virtual channel identifier of VC1 and will be switched to output port 141, having been given a virtual channel identifier of VC2, as long as row 1 of the lookup table is enabled. Packets then enter input port 139 of ATM switch 132 and are switched to output port 135 with a virtual channel identifier of VCo as indicated in row one of the lookup table. From there, the packets enter base station 130 at input port 143.

When the mobile user is handed off to the base station 131, a control message is sent to the ATM Switch/Rerouter 134. The Reroute Port of Switch/Rerouter 134 disables the first row of its lookup table and enables the second row, thus causing a new virtual channel identifier, VC7, corresponding to new base station 131, to be assigned to packets coming into the tree from the fixed path at input port 147. These packets had previously been assigned VC2, corresponding to base station 130 as a destination. Now the packets enter ATM switch 132 at input port 139 and their VCI corresponds to row two of the lookup table, thus resulting in their being assigned virtual channel identifier VCo and being sent via output port 137 to input port 145 of base station 131.

As a result, a virtual channel connection 151 will be established between ATM Switch/Rerouter 134 and base station 131 having a reverse route from output port 146 of base station 131 to input port 138 of ATM switch 132, via port 140, into port 142 of ATM Switch/Rerouter 134, and out of port 148. Note that the virtual channel identifier at the mobile user's access point as well as in ATM Switch/Rerouter 134 will remain the same as in the first method of scheme two.

One skilled in the art will appreciate that the analysis of the second method of scheme two may be extrapolated to confirm that only one Switch/Rerouter is necessary for a more expansive connection tree if the Switch/Rerouter is placed at the root of the connection tree. The lookup table would, of course, be much more complex, with a greater number of rows being needed for each connection ID.

While the above is a description of the invention in its preferred embodiment, various modifications, alternate constructions and equivalents may be employed, only some of which have been described above. Therefore, the above description and illustration should not be taken as limiting the scope of the invention which is defined by the appended claims.

We claim:

1. A mobile-communications connection-and-routing method comprising the steps of:

detecting an attempted mobile communication in the vicinity of a first base station in a network comprising a plurality of switches, communication links and base stations, each base station corresponding to a geographical cell;

setting up a connection tree within the network, the connection tree comprising a plurality of communication routes, each route extending from a first switch within the network through at least one other switch and at least two communication links to a base station, each base station situated within a predetermined distance of the first base station, so that a route is defined from each of the base stations within the predetermined distance to the first switch;

setting up a fixed route within the network which extends from the first switch to a location within the network and outside of the connection tree;

admitting the communication to the connection tree; and routing the communication through a first route between the first base station and the first switch, the first route being one of the plurality of communication routes within the connection tree, and between the first switch and the location outside of the connection tree through the fixed route, whereby the mobile user can communicate back and forth along a complete communication route with the location outside of the connection tree.

2. The method of claim 1 further comprising the steps of:

initiating a change of the mobile user's base station from the first base station to a second base station upon the mobile user moving from the cell corresponding to the first base station to the cell corresponding to the second base station, the second base station corresponding to a second route which is one of the plurality of communication routes within the connection tree and which connects the second base station to the first switch; and changing the portion of the complete communication route located within the connection tree from the first route to the second route.

3. The method of claim 2 wherein the switches and communication links are capable of supporting asynchronous transfer mode communications.

4. The method of claim 3 wherein the "initiating" step is performed by the user sending a control message to the switches in the connection tree.

5. The method of claim 3 wherein the "initiating" step is performed by the user sending to the switches in the connection tree a virtual channel identifier corresponding to the second base station.

6. The method of claim 3 wherein the "initiating" and "changing" steps are performed each time the mobile user moves from one cell to another cell, the cells being located within the predetermined distance of the first base station.

7. The method of claim 2 wherein the "initiating" step is performed by the user sending a control message to the switches in the connection tree.

8. The method of claim 2 wherein the "initiating" and "changing" steps are performed each time the mobile user moves from one cell to another cell, the cells being located within the predetermined distance of the first base station.

9. The method of claims 1 or 2 wherein the attempted communication is initiated by the mobile user.

10. The method of claims 1 or 2 wherein the attempted communication is initiated at the location within the network and outside of the connection tree.

11. The method of claim 1 wherein the switches and communication links are capable of supporting asynchronous transfer mode communications.

12. A mobile-communications connection-and-routing method comprising the steps of:

detecting an attempted mobile communication in the vicinity of a first base station in a network comprising a plurality of switches, communication links and base stations, each base station corresponding to a geographical cell;

setting up a connection tree within the network, the connection tree comprising a plurality of communication routes, each route extending from a first switch within the network through at least one other switch and at least two communication links to a base station, each base station situated within a predetermined distance of the first base station, so that a route is defined from each of the base stations within the predetermined distance to the first switch;

admitting the communication to the connection tree; and routing the communication through a first route between the first base station and the first switch, the first route being one of the plurality of communication routes within the connection tree, and between the first switch and a second base station within the predetermined distance of the first base station through a second route, the second route being one of the plurality of communication routes within the connection tree, whereby the mobile user can communicate back and forth along a complete communication route with the second base station within the connection tree.

13. The method of claim 12 further comprising the steps of:

initiating a change of the mobile user's base station from the first base station to a third base station upon the mobile user moving from the cell corresponding to the first base station to the cell corresponding to the third base station, the third base station corresponding to a third route which is one of the plurality of communication routes within the connection tree and which connects the third base station to the first switch; and changing the first route portion of the complete communication route from the first route to the third route.

14. A system for mobile-communications connection and routing comprising:

a network comprising a plurality of switches, communication links and base stations capable of supporting asynchronous transfer mode communications;

means for detecting an attempted mobile communication in the vicinity of a first base station in the network;

means for setting up a connection tree within the network, the connection tree comprising a plurality of communication routes, each route extending from a fixed point of the network, the fixed point being a switch, through at least one other switch and at least three communication links to all base stations within a predetermined distance of the first base station so that a route is defined from each of the base stations within the predetermined distance to the fixed point switch;

means for setting up a fixed route within the network which extends from the fixed point switch to a desired destination within the network and outside the connection tree;

means for admitting the communication to the connection tree at the first base station; and means for routing the communication from the first base station through a first route, which is one of the plurality of communication routes within the connection tree, to the fixed point, and from the fixed point through the fixed route to the destination, whereby the mobile user can communicate back and forth with the destination.

15. The system of claim 14 further comprising:

means for initiating a change of the mobile user's base station from the first base station to a second base station, the second base station corresponding to a second route, which is one of the plurality of communication routes within the connection tree and which connects the second base station to the fixed point; and means for rerouting the communication within the connection tree from the first route to the second route.

16. A system for mobile-communications connection and routing comprising:

means for detecting an attempted mobile communication in the vicinity of a first base station in a network comprising a plurality of switches, communication links and base stations, each base station corresponding to a geographical cell;

means for setting up a connection tree within the network, the connection tree comprising a plurality of communication routes, each route extending from a first switch within the network through at least one other switch and at least two communication links to a base station, each base station situated within a predetermined distance of the first base station, so that a route is defined from each of the base stations within the predetermined distance to the first switch;

means for admitting the communication to the connection tree; and means for routing the communication through a first route between the first base station and the first switch, the first route being one of the plurality of communication routes within the connection tree, and between the first switch and a second base station within the predetermined distance of the first base station through a second route, the second route being one of the plurality of communication routes within the connection tree, whereby the mobile user can communicate back and forth along a complete communication route with the second base station within the connection tree.

17. The system of claim 16 further comprising:

means for initiating a change of the mobile user's base station from the first base station to a third base station upon the mobile user moving from the cell corresponding to the first base station to the cell corresponding to the third base station, the third base station corresponding to a third route which is one of the plurality of communication routes within the connection tree and which connects the third base station to the first switch; and means for changing the first route portion of the complete communication route from the first route to the third route.

18. A connection-and-routing method for mobile communications in a network comprising base stations, switching nodes, and communication links, each one of the base stations corresponding to a geographical cell, the method comprising:

determining a communication route within the network, the connection route connecting a first one of the base stations to a first one of the switching nodes by a first portion of the communication route, and the connection route connecting the first one of the switching nodes further by a second portion of the communication route, the first one of the base stations being within communication range of a mobile user, determining a connection tree within the network, the connection tree comprising the first portion of the connection route and at least one potential first portion of the communication route within the network, the at least one potential first portion connecting a second one of the base stations to the first one of the switching nodes, upon realization of a predetermined condition depending on movement of the mobile user, changing the communication route by replacement of the first portion of the communication route with the potential first portion of the communication route.

\* \* \* \* \*

UNITED STATES PATENT AND TRADEMARK OFFICE
CERTIFICATE OF CORRECTION

PATENT NO. : 5,528,583
DATED : June 18, 1996
INVENTOR(S) : Anthony S. Acampora et al.

It is certified that error appears in the above-indentified patent and that said Letters Patent is hereby corrected as shown below:

Col. 1, following the Title, insert -- The United States Government has certain rights in the invention under Contract CDR-88111 awarded by the National Science Foundation. --.
Col. 3, line 33, "simple a" should read -- simple --. -- Col. 9, line 11, "forth" should read -- fourth --.

Signed and Sealed this

Twenty-sixth Day of November 1996

Attest:

BRUCE LEHMAN

Attesting Officer          Commissioner of Patents and Trademarks